(12) United States Patent
Tangirala et al.

(10) Patent No.: US 6,983,586 B2
(45) Date of Patent: Jan. 10, 2006

(54) TWO-STAGE PULSE DETONATION SYSTEM

(75) Inventors: Venkat Eswarlu Tangirala, Niskayuna, NY (US); Anthony John Dean, Scotia, NY (US); Ivett Alejandra Leyva, Los Angeles, CA (US)

(73) Assignee: General Electric Company, Niskayuna, NY (US)

( * ) Notice: Subject to any disclaimer, the term of this patent is extended or adjusted under 35 U.S.C. 154(b) by 148 days.

(21) Appl. No.: 10/730,219

(22) Filed: Dec. 8, 2003

(65) Prior Publication Data

US 2005/0120700 A1 Jun. 9, 2005

(51) Int. Cl.
*F23R 7/00* (2006.01)

(52) U.S. Cl. ............... 60/39.77; 60/226.1; 60/247; 60/249; 60/762

(58) Field of Classification Search ............... 60/226.1, 60/247, 249, 761, 762, 39.77, 39.78, 39.38
See application file for complete search history.

(56) References Cited

U.S. PATENT DOCUMENTS

| | | | | |
|---|---|---|---|---|
| 2,647,365 A | * | 8/1953 | Myers | 60/767 |
| 2,687,614 A | * | 8/1954 | Goddard | 60/39.77 |
| 2,715,436 A | * | 8/1955 | Bodo | 431/1 |
| 3,266,252 A | * | 8/1966 | Hughes | 60/39.77 |
| 3,848,408 A | * | 11/1974 | Tompkins | 60/248 |
| 5,513,489 A | | 5/1996 | Bussing | |
| 5,694,768 A | | 12/1997 | Johnson et al. | |
| 5,873,240 A | | 2/1999 | Bussing et al. | |
| 5,937,635 A | | 8/1999 | Winfree et al. | |
| 6,349,503 B1 | | 2/2002 | Gompertz et al. | |
| 6,349,538 B1 | | 2/2002 | Hunter, Jr. et al. | |
| 6,442,930 B1 | | 9/2002 | Johnson et al. | |
| 6,477,829 B1 | | 11/2002 | Hunter et al. | |
| 6,505,462 B2 | | 1/2003 | Meholic | |
| 6,516,605 B1 | | 2/2003 | Meholic | |
| 6,550,235 B2 | | 4/2003 | Johnson et al. | |
| 6,666,018 B2 | | 12/2003 | Butler et al. | |
| 6,813,878 B2 | * | 11/2004 | Kraft | 60/247 |
| 6,868,665 B2 | * | 3/2005 | Koshoffer et al. | 60/247 |
| 2002/0166318 A1 | | 11/2002 | Baker et al. | |
| 2003/0029161 A1 | | 2/2003 | Hunter, Jr. | |
| 2003/0029162 A1 | | 2/2003 | Baker | |
| 2004/0118104 A1 | * | 6/2004 | Koshoffer | 60/204 |
| 2004/0154306 A1 | * | 8/2004 | Benians | 60/776 |

(Continued)

FOREIGN PATENT DOCUMENTS

DE 2046079 9/1970

(Continued)

OTHER PUBLICATIONS

European Search Report, Application No. EP 01 30 3058, Place of Search "MUnich", Jul. 26, 2001, Examiner P. Acton, pp. 14.

(Continued)

*Primary Examiner*—Ehud Gartenberg
(74) *Attorney, Agent, or Firm*—Penny A. Clarke; Patrick K. Patnode (57) ABSTRACT

A two-stage pulse detonation system includes a pre-combustor and a geometric resonator connected via a converging-diverging nozzle to the pre-combustor to create a high temperature and high pressure conditions in the resonator in order to create optimal conditions for detonation initiation. A mixture of a fuel and a gas is burned in the pre-combustor and is passed through the nozzle into the geometric resonator, where the burned mixture is detonated. The detonation propagates through the resonator exit nozzle thus generating thrust.

70 Claims, 6 Drawing Sheets

U.S. PATENT DOCUMENTS

2004/0244359 A1 * 12/2004 Koshoffer et al. ............ 60/247

FOREIGN PATENT DOCUMENTS

| EP | 1138922 | 10/2001 |
|---|---|---|
| EP | 1431563 | 6/2004 |
| WO | 8706976 | 5/1987 |

OTHER PUBLICATIONS

GB Search Report, GB0422410.1, Feb. 4, 2005.

* cited by examiner

TWO-STAGE PULSE DETONATION SYSTEM

STATEMENT REGARDING FEDERALLY SPONSORED RESEARCH & DEVELOPMENT

This invention was made with Government support under contract number DABT-6300-C-0001 awarded by DARPA. The Government has certain rights in the invention.

BACKGROUND OF THE INVENTION

This invention relates to pulse detonation systems, and more particularly, to two-stage pulse detonation systems.

Variable cycle turbofan ramjet engines may be used to provide aircraft flight speeds between low subsonic Mach numbers to high supersonic Mach numbers of about Mach 6. Known engines include a core engine system and a dual mode augmentor. The dual mode augmentor provides additional heat to exhaust airflow exiting the core engine system to increase engine thrust. The core engine system provides power to drive a fan assembly and typically includes in serial, axial flow relationship, a compressor, a combustor, a high pressure turbine, and a low pressure turbine. The dual mode augmentor is positioned downstream from the core engine and receives air from the core engine and a bypass duct surrounding the core engine.

Known engines can operate over a wide range of flight speed operations if several different combustion systems are utilized. During flight speed operations from take-off to approximately Mach 3, the core engine and an engine fan system provide airflow at a pressure and quantity used by the augmentor to produce thrust for the engine. To maintain flight speed operations between Mach 3 and Mach 6, the core engine system is shut-down and ram air flow is introduced into the dual mode augmentor either by windmilling the fan system or by utilizing an auxiliary ram duct. To sustain flight speed operations above Mach 6, either a separate supersonic combustion system, i.e., a scramjet, is used, or a separate rocket-based thrust producing system is used. To achieve flight speed operations in space, the rocketbased thrust producing system is used. As a result, for an engine to operate efficiently over a wide range of operating flight speeds, several different combustion systems are used.

Efforts to address the drawback of needing a combination of combustion systems to obtain a wide range of flight speeds have led to the development of pulse detonation engines, which aid in increasing the available flight speed range while reducing the need for a combination of combustion systems.

One implementation that has been proposed for an engine with a pulse detonation system contains at least one tube pulse detonation engine (PDE). The PDE can be positioned as an augmentor or as the main combustor or both. However, tube pulse detonation systems have some drawbacks. These systems use mechanical valves to aid in the control of the detonation, which add complexity and cost, as well as a limit to the detonation frequency that can be achieved. Lower detonation frequencies can also adversely affect the components within the engine system because of the shock and vibrations created by the detonations. Furthermore, tube PDE systems do not operate efficiently with commonly used aviation fuels. The 2-stage PDE that is described in this invention fills the need of using aviation fuels and high frequency operation. Thrust is generated using detonations which is proven to be the most efficient way to extract energy from a given fuel-air mixture which is detonable.

SUMMARY OF THE INVENTION

In an embodiment of the invention, a turbofan engine includes a two-stage pulse detonation system to permit the engine to operate efficiently and effectively over a wide range of flight speeds. The two-stage pulse detonation engine increases the operating detonation frequency of the engine without the physical limitations imposed by mechanical control valves or other turbomachinery. This increases the overall engine thrust and life expectancy of the components. The two-stage pulse detonation system includes a pre-combustor and a geometric resonator, or a plurality of geometric resonators, which provide added thrust to the engine. The precombustor can be any system that makes a fuel/oxidizer mixture more detonable. Examples of a precombustor are a constant pressure combustor, a pyrolysis system, and a catalytic system.

During operation, a rich fuel air mixture is burned in the pre-combustor under constant pressure, which produces a mixture of detonable components such as CO and $H_2$. Following the pre-combustor, the resulting mixture is then directed into either a two-dimensional or three-dimensional geometric resonator, along with additional air, which creates detonation conditions, causing detonation of the mixture in the geometric resonator. In some cases an ignition source is also added to the resonator mixture to promote detonations. The ignition source can be a spark, an external shock, etc. Detonation of a fuel/air mixture in the geometric resonator produces hot combustion gases with increased temperature and pressure. The hot combustion gases are directed outward from the engine resulting in the production of thrust.

BRIEF DESCRIPTION OF THE DRAWINGS

The advantages, nature and various additional features of the invention will appear more fully upon consideration of the illustrative embodiment of the invention which is schematically set forth in the figures, in which.

DETAILED DESCRIPTION OF THE INVENTION

The present invention will be explained in further detail by making reference to the accompanying drawings, which do not limit the scope of the invention in any way.

Figure 1:
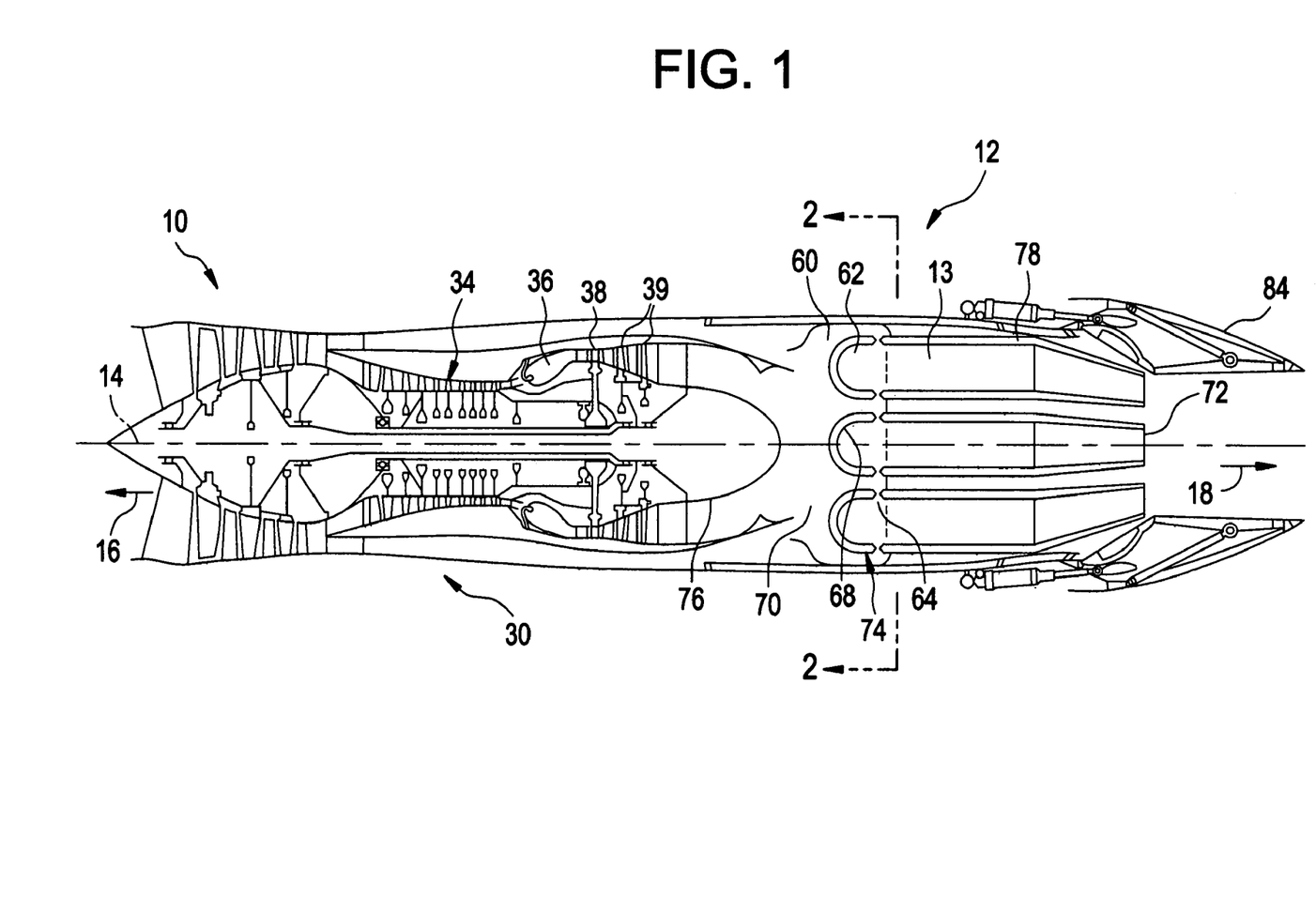
FIG. 1 is a cross-sectional side view of a turbofan engine including a two-stage pulse detonation system.
Figure 2:
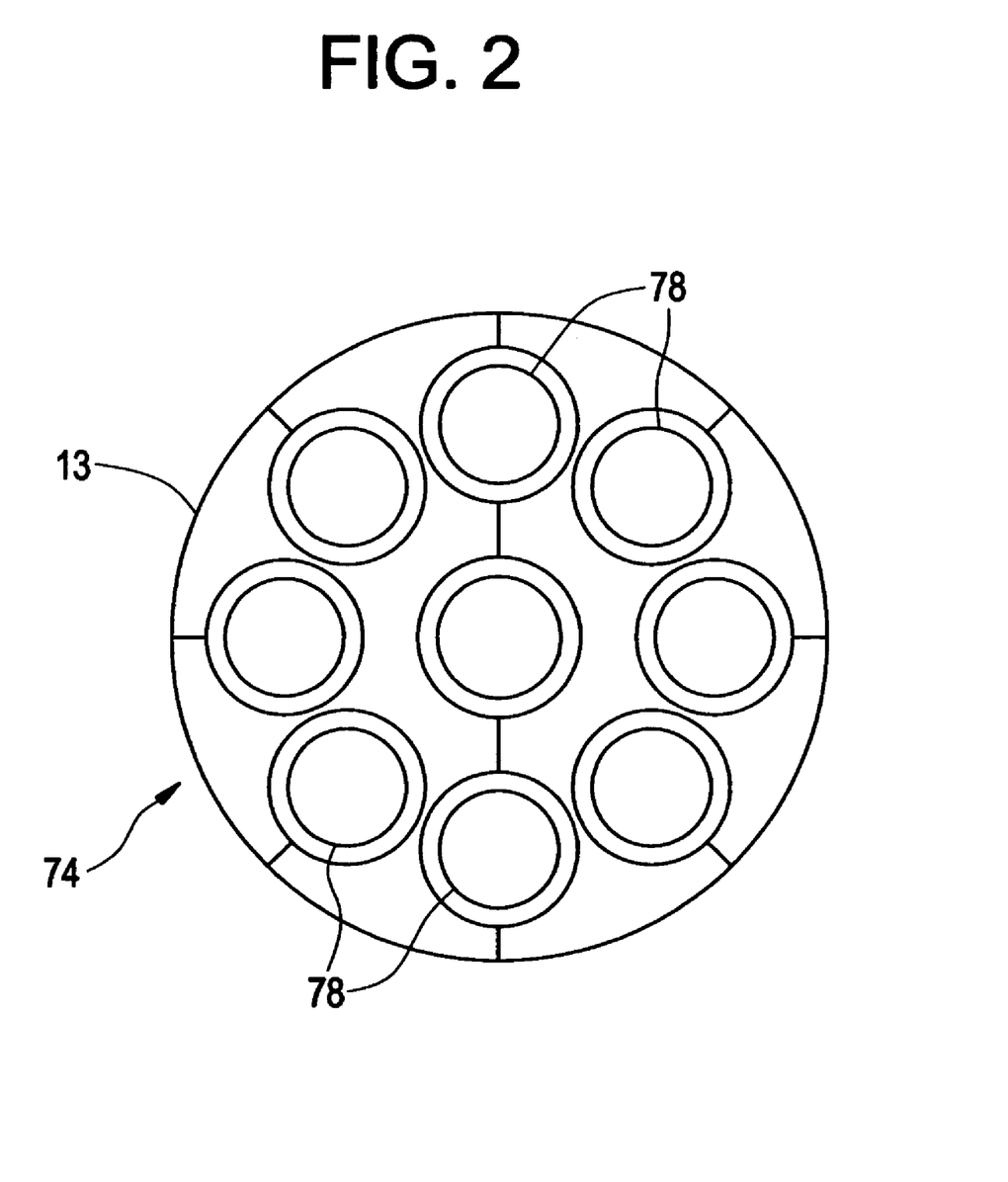
FIG. 2 is a cross-sectional view of a pulse detonation augmentor used with the two-stage pulse detonation system shown in FIG. 1 taken along lines 2—2.

FIG. 1 is a cross-sectional side view of a turbofan engine 10 including a two-stage pulse detonation system 12 which includes at least one geometric resonator. In this case, the PDE system is positioned as an augmentor, that is, after the engine turbine. FIG. 2 is a cross sectional view of a two-stage pulse detonation augmentor 13 taken along lines 2—2; shown in FIG. 1. In one embodiment, turbofan engine 10 is an F110/129 engine available from General Electric Aircraft Engines, Cincinnati, Ohio. Engine 10 has a generally longitudinally extending axis or centerline 14 extending in a forward direction 16 and an aft direction 18. Engine 10 includes a core engine 30 which includes a high pressure compressor 34, a combustor 36, a high pressure turbine 38, and a power turbine or a low pressure turbine 39 all arranged in a serial, axial flow relationship. In alternative embodiments, engine 10 includes a core fan assembly (not shown).

In another embodiment, the two-stage system can also be positioned between the compressor and the turbine. In this case, the two-stage PDE 12 would replace the combustor 36 in FIG. 1. A different embodiment includes having an engine with a two-stage PDE system acting as both the main combustor 36 and as an augmentor.

The two-stage pulse detonation system 12 is disposed downstream from both core engine 30 and receives bypass air from the engine fan system. The two-stage pulse detonation system 12 creates high frequency detonations of a fuel/air mixture resulting in the creation of high temperature and pressure gas, which is ejected from the engine resulting in the creation of thrust. The operation of the two-stage pulse detonation system will be discussed more fully below. The two-stage pulse detonation system 12 includes an inlet side 70 having a pre-combustor 60, a grouping of at least one geometric resonator 62, an outlet side 72, and a shock focusing sub-system 74. In one embodiment, one pre-combustor 60 provides detonable mixture for more than one geometric resonator 62. Inlet side 70 is upstream from outlet side 72 and circumferentially surrounds an engine centerbody 76.

As used herein, a "pulse detonation engine" is understood to mean any device or system that produces both a pressure rise and velocity increase from a series of repeating detonations or quasi-detonations within the device. A "quasi-detonation" is a supersonic turbulent combustion process that produces a pressure rise and velocity increase higher than the pressure rise and velocity increase produced by a deflagration wave. Typical embodiments of pulse detonation engines include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation (cross-fire). The geometry of the detonation chamber is such that the pressure rise of the detonation wave expels combustion products out the pulse detonation engine exhaust to produce a thrust force. As known to those skilled in the art, pulse detonation may be accomplished in a number of types of detonation chambers, including detonation tubes, shock tubes, resonating detonation cavities and annular detonation chambers.

The shock focusing sub-system 74 includes at least one nozzle 78 extending from the geometric resonators 62 and the system outlet side 72. The nozzles 78 allow the fuel and air mixture, which is detonated in the geometric resonators 62, to be passed to the outlet side 72 creating additional thrust. In one embodiment, each nozzle 78 has a circular cross-section and the shock focusing sub-system 74 has a circular cross-sectional profile. In other embodiments, the shock focusing sub-system 74 has a non-circular cross-sectional profile. In a different embodiment, the nozzles 78 have non-circular cross-sections, for example having a polygon or rectangular cross-section. Nozzles 78 extend from geometric resonators 62 to an exhaust nozzle 84. Exhaust nozzle 84 is disposed downstream from the two-stage pulse detonation system 12 and nozzle 78.

During operation, airflow enters engine 10 and fuel is introduced to core engine 30. The air and fuel are mixed and ignited within core engine 30 to generate hot combustion gases. Specifically, pressurized air from high pressure compressor 34 is mixed with fuel in combustor 36 and ignited, thereby generating combustion gases. Such combustion gases drive high pressure turbine 38 which drives high pressure compressor 34. The combustion gases are discharged from high pressure turbine 38 into low pressure turbine 39. The core airflow is discharged from low pressure turbine 39.

A small fraction of bypass airflow is channeled into the pre-combustor 60 where additional fuel is added to the airflow. The fuel used throughout the engine is any known hydrocarbon fuel acceptable for use in aviation engine applications, including for example JP-4, Jet-A, and JP-8. The amount of fuel injected into the pre-combustor 60 is such that a rich fuel-to-air ratio is achieved. In one embodiment, the rich fuel-to-air mixture ratio is in the range of 2 to 3. In another embodiment, an additional gas, such as oxygen, is used in the pre-combustor 60 mixture.

After the rich fuel mixture is combined, the resulting mixture is burned in the pre-combustor 60 under a constant pressure combustion process. During the constant pressure combustion process, some of the hydrocarbon fuel is burned, while some is partially oxidized, which chemically changes some of the fuel resulting in the production of additional detonable components such as CO and $H_2$.

In one embodiment, the pressure within the pre-combustor under which the fuel-air-mixture is burned is approximately 3 atm. The rich fuel-to-air mixture is obtained by using at least one dual premixing swirler and establishing a premixed turbulent jet flame.

The burned fuel mixture, and detonable components, are directed from the pre-combustor 60 through converging-diverging nozzles 64, at or near sonic speeds, into the geometric resonators 62. Prior to entering the geometric resonators 62 the burned fuel mixture is further mixed with a secondary gas injected into the flow passing through the nozzles 64. The newly created mixture exits the converging-diverging nozzles 64 under high pressure, into the geometric resonators 62. In an embodiment, the secondary gas is air.

In one embodiment, the amount of secondary air added to the burned pre-combustor flow is such that the resultant fuel-to-air ratio is 1. Having a resultant fuel-to-air ratio of 1 entering the geometric resonator permits the maximum fuel consumption when the fuel/air mixture is detonated in the geometric resonator 62. The amount of secondary air added to the burned pre-combustor flow is such that a fuel-to-air ratio of 1 is achieved with respect to the total air mass used in the precombustor and the resonator.

As the new fuel/air mixture exits the converging-diverging nozzles 64, the exiting flow is directed radially toward the axis of symmetry of the geometric resonators 62. The flow from the nozzles 64 collides at the axis of symmetry of the geometric resonator 62 creating a region of stagnation conditions with increased pressure and temperature. The resulting pressure increase within the geometric resonator 62 creates a pressure wave which chokes the flow exiting from the nozzles 64. In one embodiment, the high pressure and temperature region created acts as an initiator to detonate the fuel/air mixture. The resulting detonation propagates down the resonator exit nozzles 78, and exits the nozzles 78 at the outlet side 72, creating additional thrust.

The frequency and intensity of the detonation of the fuel/air mixture within the geometric resonators 62 is governed by the geometry, composition, temperature, and pressure at which the fuel/air mixture exits the nozzles 64 and enters the geometric resonators 62. All of these parameters are optimized to achieve a high frequency of detonation, an efficient consumption of the fuel within the geometric resonators 62, and the adequate induction time for detonation.

Before the flow detonates in the resonator, the flow emitted from nozzles 64 is choked due to the pressure ratio across them. This limits the flow entering the geometric resonators 62. Further, this choking of the flow aids in permitting the detonation of the fuel/air mixture within the geometric resonators 62. As the detonation is formed, it creates a high pressure downstream of nozzles 64, which decreases significantly or even reverses the flow direction across these nozzles. Once the detonation of the fuel/air mixture within the geometric resonators 62, the detonated fuel/air mixture exits the geometric resonator 62 and proceeds along the resonator exit nozzles 78. As the detonated fuel/air mixture exits the geometric resonator a pressure drop within the geometric resonator 62 occurs. The pressure drop permits the nozzle flow to choke again and enter the geometric resonator 62, allowing a repeat of the cycle.

In one embodiment, some of the pressure waves created by the inflow of the fuel/air mixture from the nozzles 64, into the geometric resonators 62, also radiate toward the reflective surfaces 68 of the geometric resonators 62. The pressure waves directed at the reflective surfaces 68 are reflected and directed by the shape of the reflective surfaces 68 to a focus point of high pressure and temperature. The high pressure and temperature created at the focal point aids in the detonation of the fuel/air mixture emitted from the nozzles 64. This detonation propagates along the resonator exit nozzles 78 and exits at the outlet side 72.

In one embodiment, the focal point of the pressure waves reflected from the reflective surfaces 68 corresponds to the region of stagnation conditions created by the flow of the fuel/air mixture from the converging-diverging nozzles 64. The convergence of the reflected pressure waves and the stagnation region of the flow entering from the nozzles 64 creates a high pressure and high temperature region at the point of convergence resulting in the detonation of the fuel/air mixture. The detonation is then directed along the resonator exit nozzles 78 and exits the nozzles 78 at the outlet side 72, resulting in additional thrust.

It is noted that shown in FIGS. 1 and 2 the engine 10 is shown having a plurality of geometric resonators 62 and resonator exit nozzles 78. However, in one embodiment, a single geometric resonator 62 and resonator exit nozzles 78 combination is used.

Figure 3:
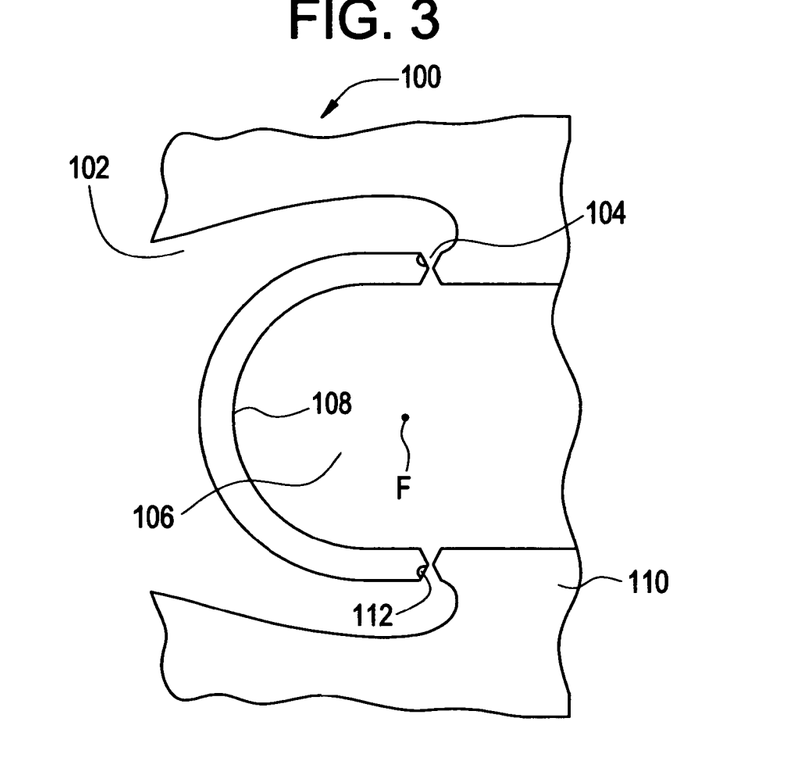
FIG. 3 is a cross-sectional view of a portion of a two-stage pulse detonation system.

FIG. 3 shows a cross-sectional view of a portion of a two-stage pulse detonation system 100. As discussed above, a hydrocarbon fuel is mixed with air resulting in a fuel-rich mixture, which is burned in the pre-combustor 102 at a constant pressure. The resultant mixture of partially burned fuel, and remaining components from the combustion, is passed through the converging-diverging nozzle 104, where it is further mixed with a secondary air exiting from ports 112 to create an equal fuel-to-air ratio. The resultant mixture passes into the geometric resonator 106 having a cylindrical pressure wave reflection surface 108. The two-stage pulse detonation engine also includes a resonator exit nozzle 110 to transmit the detonated fuel/air mixture to the exit of the resonator exit nozzle and engine (not shown). The shape of the pressure wave reflection surface 108 has a two-dimensional curved surface having a focal point F, where the reflected pressure wave in the geometric resonator 106 is focused. The shape is that of a portion of a cylinder having its long axis passing through the focal point F.

In one embodiment, the curvature of the pressure wave reflection surface 108 is three-dimensional. In this embodiment, the surface shape is a portion of a sphere having a focal point F.

The geometric resonator 106, the surface 108 and the resonator exit nozzle 110 are made from high temperature aerospace materials which tolerate high pressure and high temperature conditions, such as those resulting from the repeated detonation of the fuel/air mixture within the geometric resonator 106.

The converging-diverging nozzle 104 is configured as a radially formed annulus, which circumvents the perimeter of the geometric resonator 106. The fuel/air mixture exits the nozzle 104 radially towards the center of the geometric resonator 106 to create a high pressure and temperature stagnation region at which initiation and detonation occurs. In a further embodiment, the nozzle 104 is configured as a plurality of discrete channel openings, where at least one channel opening is located on an upper surface of the geometrical resonator 106 and at least one other channel opening is located on a bottom surface of the geometrical resonator 106.

In one embodiment, a plurality of individual discrete nozzles 104 are distributed radially around the perimeter of the geometric resonator 106. Each of the nozzles direct the fuel/air mixture from the pre-combustor 102 to a central region of the geometric resonator 106. In another embodiment, a number of the discrete nozzles 104 direct the fuel/air mixture from the pre-combustor 102 toward a center of the geometric resonator 106, while the remaining nozzles 104 direct secondary air toward the center of the geometric resonator 106.

Figure 4:
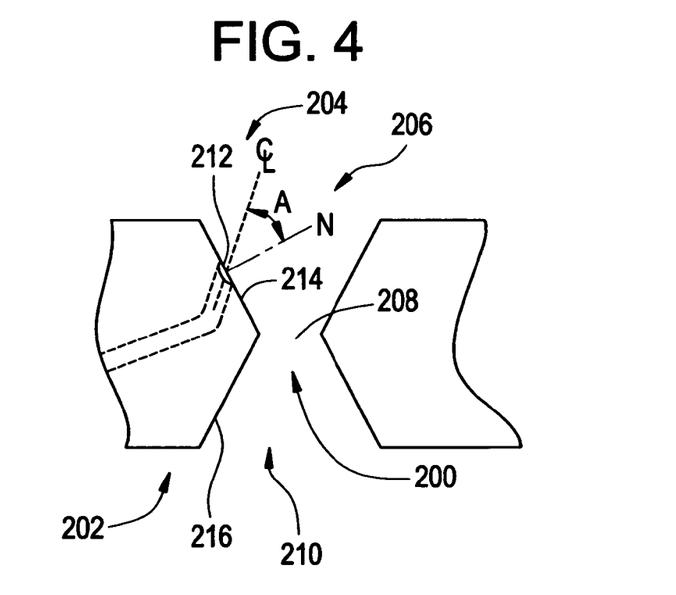
FIG. 4 is a cross-sectional view of a converging-diverging nozzle used in a two-stage pulse detonation system.

FIG. 4 is a cross-section of a converging-diverging nozzle 200 which circumvents the perimeter of a geometric resonator 202. The converging-diverging nozzle 200 is configured to permit supersonic or near supersonic flow from the pre-combustor 204 to the geometric resonator 202. The nozzle 200 is made from high temperature aerospace materials. In one embodiment, the interior surfaces of the nozzle 200 are coated with thermal barrier coatings.

In one embodiment, the dimensions of the nozzle inlet 206, throat 208, and outlet 210, and the dimensional relationships therebetween, are optimized to limit the amount of pressure drop realized in the flow from the pre-combustor 204 into the geometric resonator 202. Typical geometric parameters of such a radially inward converging-diverging nozzle include: the shape-profile of the walls, including: wall angles, lengths of converging and diverging sections, throat width and its radial location. Optimization of these geometric dimensions reduces the pressure losses realized between the inlet 206 and outlet 210 of the nozzle 200. The reduction of pressure loss permits the two-stage pulse detonation system to operate at a lower overall pressure and increases the overall performance of the 2-stage PDE system. A lower pressure loss across the nozzle 200 allows the use of a lower operating pressure within the pre-combustor 204 resulting in an improved cycle efficiency. Further, the reduction of pressure loss across the nozzle reduces ignition delay prior to the onset of detonation within the geometric resonator 202.

As discussed previously, the frequency and time before detonation of the fuel/air mixture within the geometric resonator 202 is related to the resonator geometry, composition, temperature and pressure of the fuel/air mixture. As the rate at which pressure within the geometric resonator 202 increases, or reaches a predetermined level, the delay between sequential detonations decreases. Thus, the frequency at which the two-stage pulse detonation system can operate is increased by the reduced the pressure loss in the converging-diverging nozzle 202. Further, the overall system efficiency is increased because the pressure within the pre-combustor 204 is maintained at a lower overall pressure, without adversely affecting the detonations within the resonator 202.

Located within the converging-diverging nozzle 200 a plurality of secondary air ports 212 are positioned to inject secondary air into the fuel/air mixture passing from the pre-combustor 204 to the geometric resonator 202. In one embodiment, to achieve optimal detonation efficiency and frequency, a fuel-to-air ratio within the geometric resonator 202 of 1 is used. This is achieved with the injection of the proper amount of secondary air from the ports 212 into the burned fuel-rich mixture exiting the pre-combustor 204 and entering the geometric resonator 202. Normal atmospheric air is injected with the ports 212. In one embodiment, high pressure air flow from the core engine 30 is used as the secondary air. In another embodiment at least one of these ports could carry fuel instead of air.

The ports 212 are positioned on the converging side of the converging-diverging nozzle 200 injecting the secondary air upstream into the fuel/air flow. The ports 212 are located equidistant along the nozzle 200. The pressure of the secondary air flow exiting the ports is regulated to prevent back flow of the fuel/air mixture back into the ports 212, and to prevent the creation of a recirculation zone within the nozzle 200, in the vicinity of the ports 212.

Further, the ports 212 are angled upstream into the flow of the fuel/air mixture to ensure optimization of mixing of the secondary air into the fuel/air mixture from the pre-combustor 204. In one embodiment, the angle A at which the secondary air flow is injected into the nozzle flow is in the range of 0° to 45° with respect to the normal N to the surface 214 of the nozzle 200.

In one embodiment, the secondary air flow is injected upstream into the nozzle flow at 45° with respect to the normal N to the surface 214 of the nozzle 200.

The spacing, size and number of the ports 212 along the nozzle 200 optimize mixture of the secondary air within the nozzle 200 with the fuel/air mixture from the pre-combustor 204. In one embodiment, the spacing between the edges of the ports 212 is equal to the diameter of the ports 212.

Further, in one embodiment, rather than having the ports 212 on the converging side of the nozzle 200, the ports 212 are positioned on a diverging surface 216 on the diverging side of the nozzle 200. In this embodiment, the pressure needed for the secondary air flow is less than that needed in a configuration where the ports 212 are in the converging side of the nozzle 200. When positioned on the diverging side of the converging-diverging nozzle 200, the secondary air flow exits the ports 212 at a pressure and angle to maximize mixing of the secondary air with the fuel/air mixture. In one embodiment, the secondary air flow exits the ports on the diverging side of the nozzle 200 at an angle between 0° to 90° into the flow of the fuel/air mixture, with respect to the normal of the surface of the diverging portion of the nozzle. Having the secondary air penetrating the fuel/air mixture on the diverging side of the nozzle 200 permits the secondary air system (not shown) to operate at a lower overall operating pressure.

In one embodiment, the secondary air is preheated prior to entering the nozzle 200. Preheating the secondary air aids the fuel/air mixture, from the pre-combustor 204, in maintaining or attaining a high temperature, which aids in initiating detonation within the geometric resonator 202.

In a further embodiment, the secondary air ports 212 are located on more than one surface of the converging-diverging nozzle 200. There is a series of ports 212 on a converging surface 214 of the nozzle and a second series of ports on a diverging surface 216 of the nozzle. In another embodiment, the ports 212 positioned on the converging side of the nozzle 200 are positioned on the opposite side of the nozzle to which the ports 212 on the diverging side are positioned. This aids in achieving optimal mixing of the secondary air in the fuel/air mixture.

Further, in one embodiment, the ports 212 are positioned on opposite surfaces of the converging side of the converging-diverging nozzle 200, or are positioned on opposite surfaces of the diverging side of the nozzle 200, or both.

Figure 5:
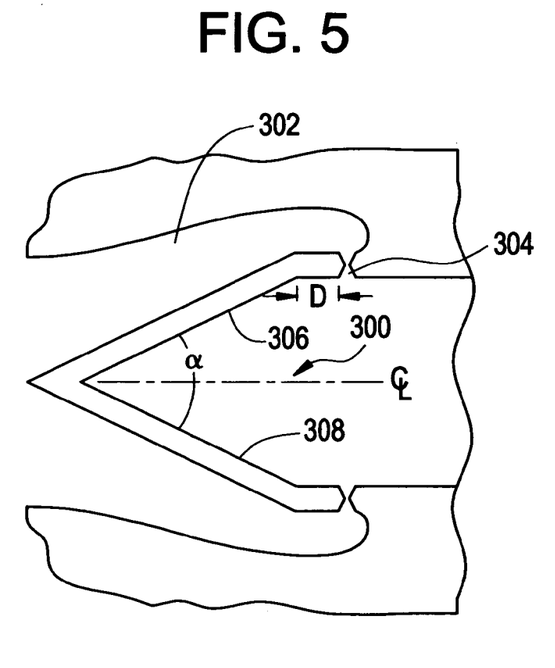
FIG. 5 is a cross-sectional view of an alternate geometric resonator used in a two-stage pulse detonation system.

FIG. 5 is a cross-sectional view of one embodiment of a geometric resonator 300 used in a two-stage pulse detonation engine. Also shown is a pre-combustor 302 and a converging-diverging nozzle 304. The pressure wave reflection surfaces 306, 308 of the geometric resonator 300 form a wedge-shape having an angle $\alpha$ to achieve the highest pressure recovery of a reflected pressure wave off of the surfaces 306, 308. Achieving optimal pressure recovery of a reflected pressure wave aids in maximizing the detonation of the fuel/air mixture within the geometric resonator 300. In one embodiment, the angle $\alpha$ between the surfaces 306, 308 is in the range of 45° to 90°. In another embodiment, the angle $\alpha$ between the reflection surfaces 306, 308 is 55°.

The reflection surfaces 306, 308 are located a distance D from the opening of the converging-diverging nozzle 304 to correspond to the focal point of the reflected pressure wave from the surfaces 306, 308 with the high temperature and pressure stagnation region created by the fuel/air mixture exiting the nozzle 304. In one embodiment, the reflection surfaces 306, 308 begin at the opening of the nozzle 304, such that the distance D is 0.

In a further embodiment, the geometric resonator 300 has a three-dimensional conical shape.

Figure 6:
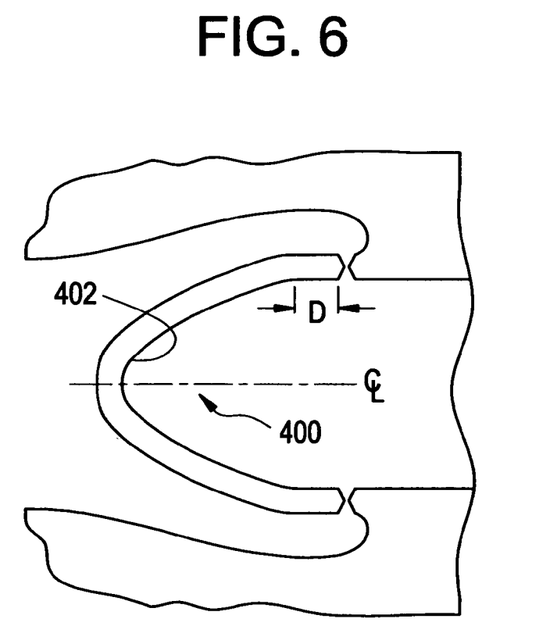
FIG. 6 is a cross-sectional view of an additional alternative geometric resonator used in a two-stage pulse detonation system.

FIG. 6 is a cross-sectional view of another geometric resonator 400 having a pressure wave reflection surface 402 which has a parabolic shape. In one embodiment, the reflection surface 402 has a three-dimensional configuration such that the curved reflective parabolic surface 402 is rotated radially around the centerline of the geometric resonator 400. The shape of the reflective surface and distance D are optimized to achieve the highest pressure recovery of the reflected pressure wave off of the reflective surface 402, and coordinate the reflected pressure wave with the fuel/air mixture stagnation region in the geometric resonator 400.

Figure 7:
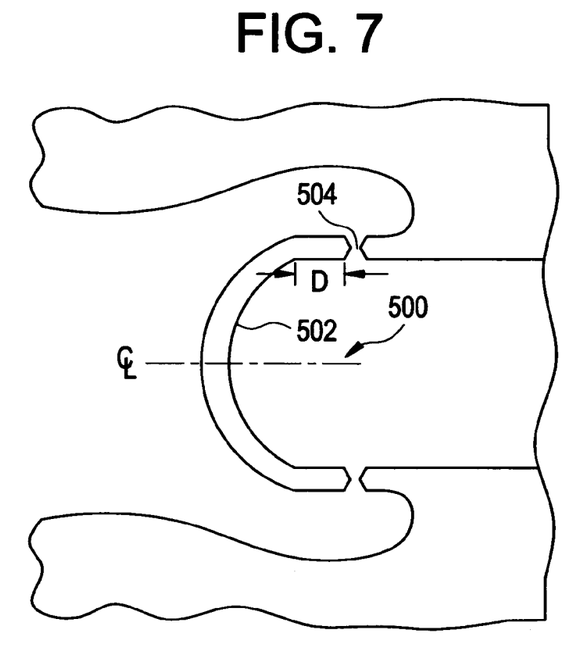
FIG. 7 is a cross-sectional view of a further geometric resonator used in a two-stage pulse detonation system.

FIG. 7 is a cross-sectional view of another geometric resonator 500 having a pressure wave reflection surface 502 with another parabolic shape. In one embodiment, the reflection surface 502 has a three-dimensional configuration such that the curved reflective surface 502 is rotated radially around the centerline of the geometric resonator 500. The shape of the reflective surface and distance D are optimized to achieve the highest pressure recovery of the reflected pressure wave off of the reflective surface 502, and coordinate the reflected pressure wave with the fuel/air mixture stagnation region in the geometric resonator 500.

Figure 8:
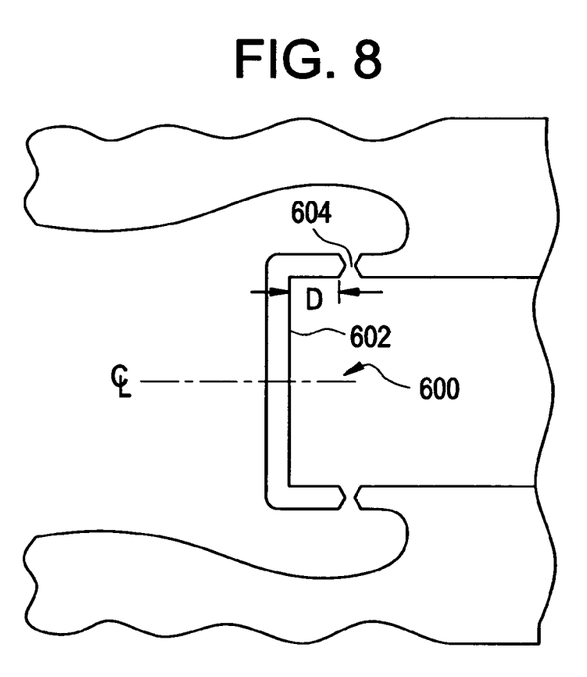
FIG. 8 is a cross-sectional view of another geometric resonator used in a two-stage pulse detonation system.

FIG. 8 is a cross-sectional view of another geometric resonator 600 having a pressure wave reflection surface 602 with a flat surface. The distance D are optimized to achieve the highest pressure recovery of the reflected pressure wave off of the reflective surface 602, and coordinate the reflected pressure wave with the fuel/air mixture stagnation region in the geometric resonator 600.

Figure 9:
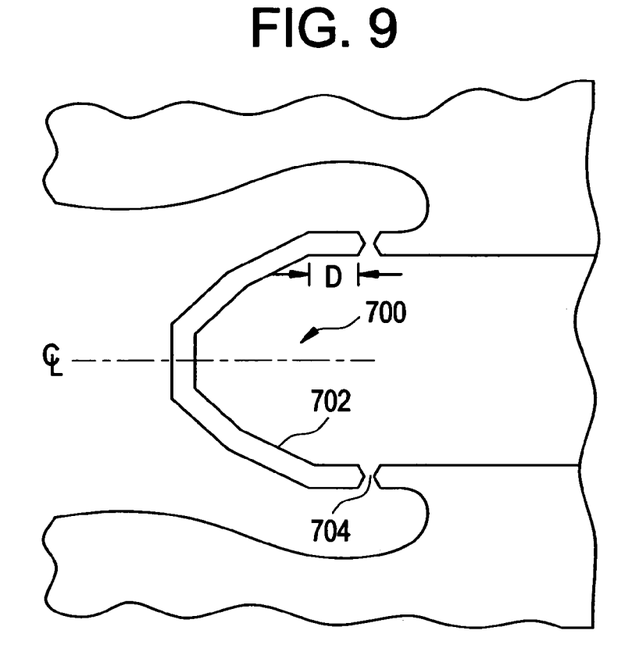
FIG. 9 is a cross-sectional view of another alternative geometric resonator used in a two-stage pulse detonation system.

FIG. 9 is a cross-sectional view of another geometric resonator 700 having a pressure wave reflection surface 702 with a plurality of faceted surfaces. In one embodiment, the reflection surfaces 702 have a three-dimensional configuration such that the faceted reflective surfaces 702 are rotated radially around the centerline of the geometric resonator 700. The shape of the reflective surfaces 702 and distance D are optimized to achieve the highest pressure recovery of the reflected pressure wave off of the reflective surfaces 702, and coordinate the reflected pressure wave with the fuel/air mixture stagnation region in the geometric resonator 700.

Figure 10:
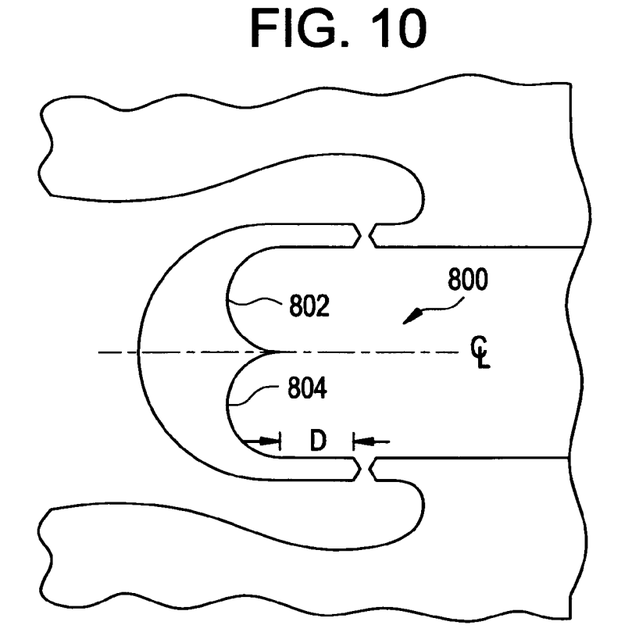
FIG. 10 is a cross-sectional view of a further alternative geometric resonator used in a two-stage pulse detonation system.

FIG. 10 is a cross-sectional view of another geometric resonator 800 having a plurality of pressure wave reflection surfaces 802, 804 having a cylindrical shape. In one embodiment, the reflection surfaces 802, 804 have a three-dimensional configuration such that the reflective surfaces 802, 804 are spherically shaped and positioned radially around the centerline of the geometric resonator 800. The shape of the reflective surfaces 802, 804 and distance D are optimized to achieve the highest pressure recovery of the reflected pressure wave off of the reflective surfaces 802, 804, and coordinate the reflected pressure wave with the fuel/air mixture stagnation region in the geometric resonator 800.

In another embodiment, the reflective surfaces 802, 804 have a parabolic shape. In a further embodiment, the reflective surfaces are flat, or have a faceted surface.

In an embodiment of the above described resonator configurations (FIGS. 5 to 10), secondary holes are added in the converging, diverging nozzles, or both sections of the nozzles, and in either side of the nozzles.

The above described two-stage pulse detonation system includes at least one pre-combustor and geometric resonator which produces additional engine thrust without the need for mechanical valves or other turbomachinery. As a result, engines using the two-stage pulse detonation system can achieve a higher detonation operating frequency, while using standard aviation hydrocarbon fuels, thus obtaining higher thrust without adverse effects created by lower operating frequencies, and without requiring a different fuel. As a result, a overall engine system is provided which permits an engine to operate with a high efficiency and performance over a wide range of operating flight speeds. Further, the above described two-stage pulse detonation engine system is capable of use in a turbofan, turbojet and ramjet engine structure.

While the invention has been described in terms of various specific embodiments, those skilled in the art will recognize that the invention can be practiced with modification within the spirit and scope of the claims.

What is claimed is:

1. A two-stage pulse detonation system, comprising:
   at least one pre-combustor configured to burn a mixture of a hydrocarbon fuel and a gas;
   at least one converging-diverging nozzle coupled to said at least one pre-combustor and configured to allow at least some of said burned mixture to pass through said at least one converging-diverging nozzle; and
   at least one geometric resonator coupled to said at least one converging-diverging nozzle and configured to receive said at least some of said burned mixture and detonate at least a portion of said received burned mixture.

2. The two-stage pulse detonation system of claim 1, wherein said gas is air.

3. The two-stage pulse detonation system of claim 1, wherein said at least one pre-combustor is configured to burn said mixture at a constant pressure.

4. The two-stage pulse detonation system of claim 2, wherein said mixture is a rich fuel-air mixture.

5. The two-stage pulse detonation system of claim 2, wherein said mixture has a fuel-to-air ratio in the range of about 2 to about 3.

6. The two-stage pulse detonation system of claim 1, further comprising at least one resonator exit nozzle coupled to said at least one geometric resonator where said resonator exit nozzle is configured to direct at least some of said detonated burned mixture to an exit of said resonator exit nozzle.

7. The two-stage pulse detonation system of claim 1, wherein said at least one converging-diverging nozzle is configured as a continuous annulus along a perimeter of said at least one geometric resonator.

8. The two-stage pulse detonation system of claim 1, wherein a plurality of said converging-diverging nozzles are positioned along a perimeter of said at least one geometric resonator, and at least some of said converging-diverging nozzles are configured to provide said fuel-gas mixture into said at least one geometric resonator.

9. The two-stage pulse detonation system of claim 1, wherein said at least one converging-diverging nozzle comprises at least one surface having a plurality of ports configured to inject a second gas into said portion of said burned mixture passing through said converging-diverging nozzle.

10. The two-stage pulse detonation system of claim 9, wherein said second gas is air.

11. The two-stage pulse detonation system of claim 9, wherein said at least one surface is a converging surface of said at least one converging-diverging nozzle.

12. The two-stage pulse detonation system of claim 9, wherein said at least one surface is a diverging surface of said at least one converging-diverging nozzle.

13. The two-stage pulse detonation system of claim 9, wherein at least some of said plurality of ports injects said second gas at an angle in the range of about 0° to about 45' with respect to a normal to said surface.

14. The two-stage pulse detonation system of claim 9, wherein at least some of said plurality of ports injects said second gas at an angle in the range of about 0 to about 90° with respect to a normal to said surface.

15. The two stage pulse detonation system of claim 9, wherein at least some of said ports direct said second gas upstream into said burned mixture passing through said converging-diverging nozzle.

16. The two stage pulse detonation system of claim 9, wherein said ports are located equidistant from each other along said surface.

17. The two stage pulse detonation system of claim 9, wherein said ports are configured to inject said second gas at a pressure to prevent said burned mixture passing through said at least one converging-diverging nozzle from entering said ports.

18. The two stage pulse detonation system of claim 9, wherein a spacing between edges of adjacent ports is equal to a width of said ports.

19. The two stage pulse detonation system of claim 9, wherein said second gas is heated prior to being injected into said burned mixture passing through said at least one converging-diverging nozzle.

20. The two stage pulse detonation system of claim 10, wherein an amount of said air injected from said ports combines with said burned mixture passing through said converging-diverging nozzle so as to attain a fuel-to-air ratio of about 1.

21. The two stage pulse detonation system of claim 1, wherein said geometric resonator has a pressure wave reflection surface.

22. The two stage pulse detonation system of claim 21, wherein said pressure wave reflection surface is configured to direct at least some reflected pressure waves to a focal point of said reflection surface.

23. The two stage pulse detonation system of claim 21, wherein said pressure wave reflection surface has a wedge shape with an upper surface and a lower surface.

24. The two stage pulse detonation system of claim 21, wherein said pressure wave reflection surface has a conical shape.

25. The two stage pulse detonation system of claim 21, wherein a shape of said pressure wave reflection surface is chosen from a group comprising cylindrical, spherical, flat, parabolic, and faceted.

26. The two stage pulse detonation system of claim 21, wherein said pressure wave reflection surface comprises a plurality of portions, where a shape of at least one of said portions is chosen from the group comprising parabolic, cylindrical, flat, spherical and faceted.

27. The two stage pulse detonation system of claim 21, wherein said pressure wave reflection surface begins at a point corresponding to an edge of said at least one converging-diverging nozzle.

28. The two stage pulse detonation system of claim 21, wherein said pressure wave reflection surface is configured to reflect at least some pressure waves to a focal point which corresponds to a pressure stagnation region formed by at least some of said received burned mixture exiting said at least one converging-diverging nozzle.

29. A two-stage pulse detonation system, comprising:
   at least one pre-combustor configured to burn a mixture of a hydrocarbon fuel and a gas;
   at least one nozzle coupled to said at least one pre-combustor and configured to allow at least some of said burned mixture to pass through said at least one nozzle; and
   at least one geometric resonator coupled to said at least one nozzle and configured to receive said at least some of said burned mixture and detonate at least a portion of said received burned mixture, wherein said geometric resonator has a pressure wave reflection surface having a wedge shape with an upper surface and a lower surface.

30. The two stage pulse detonation system of claim 29, wherein an angle between said upper surface and said lower surface is in the range of about 45° to about 120°.

31. The two stage pulse detonation system of claim 29, wherein an angle between said upper surface and said lower surface is about 55°.

32. The two stage pulse detonation system of claim 29, wherein said at least one nozzle is a converging-diverging nozzle.

33. The two stage pulse detonation system of claim 29, wherein said at least one nozzle is configured as a continuous annulus along a perimeter of said at least one geometric resonator.

34. The two-stage pulse detonation system of claim 29, wherein said at least one nozzle comprises at least one surface having a plurality of ports configured to inject a second gas into said portion of said burned mixture passing through said nozzle, and wherein said second gas is air.

35. The two-stage pulse detonation system of claim 34, wherein at least some of said plurality of ports injects said second gas at an angle in the range of about 0° to about 45° with respect to a normal to said surface.

36. The two-stage pulse detonation system of claim 34, wherein at least some of said plurality of ports injects said second gas at an angle of about 45° with respect to a normal to said surface.

37. The two stage pulse detonation system of claim 34, wherein at least some of said ports direct said second gas upstream into said burned mixture passing through said nozzle.

38. The two stage pulse detonation system of claim 34, wherein said ports are configured to inject said second gas at a pressure to prevent said burned mixture passing through said at least one nozzle from entering said ports.

39. The two stage pulse detonation system of claim 34, wherein said second gas is heated prior to being injected into said burned mixture passing through said at least one nozzle.

40. The two stage pulse detonation system of claim 34, wherein an amount of said air injected from said ports combines with said burned mixture passing through said converging-diverging nozzle to attain a fuel-to-air ratio of 1.

41. The two stage pulse detonation system of claim 29, wherein said pressure wave reflection surface is configured to direct at least some reflected pressure waves to a focal point of said reflection surface.

42. The two stage pulse detonation system of claim 29, wherein said pressure wave reflection surface begins at a point corresponding to an edge of said at least one nozzle.

43. The two stage pulse detonation system of claim 29, wherein said pressure wave reflection surface is configured to reflect at least some pressure waves to a focal point which corresponds to a pressure stagnation region formed by at least some of said received burned mixture exiting said at least one nozzle.

44. The two-stage pulse detonation system of claim 29, further comprising at least one resonator exit nozzle coupled to said at least one geometric resonator where said resonator exit nozzle is configured to direct at least some of said detonated burned mixture to an exit of said resonator exit nozzle.

45. The two-stage pulse detonation system of claim 29, wherein a plurality of said nozzles are positioned along a perimeter of said at least one geometric resonator, and at least some of said nozzles are configured to provide said at least burned mixture into said at least one geometric resonator.

46. A two-stage pulse detonation system, comprising:
   at least one pre-combustor configured to burn a mixture of a hydrocarbon fuel and a gas;

at least one nozzle coupled to said at least one pre-combustor and configured to allow at least some of said burned mixture to pass through said at least one nozzle; and at least one geometric resonator coupled to said at least one nozzle and configured to receive said at least some of said burned mixture and detonate at least a portion of said received burned mixture, wherein said at least one nozzle comprises at least one surface having a plurality of ports configured to inject a second gas into said portion of said burned mixture passing through said nozzle, and wherein at least some of said plurality of ports injects said second gas at an angle in the range of about 0° to about 45° with respect to a normal to said surface.

47. The two-stage pulse detonation system of claim 46, wherein said at least one nozzle is a converging-diverging nozzle.

48. The two-stage pulse detonation system of claim 46, wherein said gas is air.

49. The two-stage pulse detonation system of claim 46, further comprising at least one resonator exit nozzle coupled to said at least one geometric resonator where said resonator exit nozzle is configured to direct at least some of said detonated burned mixture to an exit of said resonator exit nozzle.

50. The two-stage pulse detonation system of claim 46, wherein said at least one nozzle is configured as a continuous annulus along a perimeter of said at least one geometric resonator.

51. The two-stage pulse detonation system of claim 46, wherein a plurality of said nozzles are positioned along a perimeter of said at least one geometric resonator, and at least some of said nozzles are configured to provide said at least burned mixture into said at least one geometric resonator.

52. The two-stage pulse detonation system of claim 46, wherein said second gas is air.

53. The two-stage pulse detonation system of claim 46, wherein said at least one surface is a converging surface of said at least one nozzle.

54. The two-stage pulse detonation system of claim 46, wherein said at least one surface is a diverging surface of said at least one nozzle.

55. The two-stage pulse detonation system of claim 46, wherein at least some of said plurality of ports injects said second gas at an angle of about 45° with respect to a normal to said surface.

56. The two stage pulse detonation system of claim 46, wherein at least some of said ports direct said second gas upstream into said burned mixture passing through said nozzle.

57. The two stage pulse detonation system of claim 46, wherein said ports are located equidistant from each other along said surface.

58. The two stage pulse detonation system of claim 46, wherein said ports are configured to inject said second gas at a pressure to prevent said burned mixture passing through said at least one nozzle from entering said ports.

59. The two stage pulse detonation system of claim 46, wherein a spacing between edges of adjacent ports is equal to a width of said ports.

60. The two stage pulse detonation system of claim 46, wherein said second gas is heated prior to being injected into said burned mixture passing through said at least one nozzle.

61. The two stage pulse detonation system of claim 46, wherein said geometric resonator has a pressure wave reflection surface.

62. The two stage pulse detonation system of claim 61, wherein said pressure wave reflection surface is configured to direct at least some reflected pressure waves to a focal point of said reflection surface.

63. The two stage pulse detonation system of claim 61, wherein said pressure wave reflection surface has a wedge shape with an upper surface and a lower surface.

64. The two stage pulse detonation system of claim 61, wherein said pressure wave reflection surface has a conical shape.

65. The two stage pulse detonation system of claim 61, wherein a shape of said pressure wave reflection surface is chosen from a group comprising cylindrical, spherical, flat, parabolic, and faceted.

66. The two stage pulse detonation system of claim 61, wherein said pressure wave reflection surface comprises a plurality portions, where a shape of at least one of said portions is chosen from the group comprising parabolic, cylindrical, flat, spherical and faceted.

67. The two stage pulse detonation system of claim 61, wherein said pressure wave reflection surface begins at a point corresponding to an edge of said at least one nozzle.

68. The two stage pulse detonation system of claim 61, wherein said pressure wave reflection surface is configured to reflect at least some pressure waves to a focal point which corresponds to a pressure stagnation region formed by at least some of said received burned mixture exiting said at least one converging-diverging nozzle.

69. A two-stage pulse detonation system, comprising:

at least one pre-combustor configured to burn a mixture of a hydrocarbon fuel and a gas;

at least one converging-diverging nozzle coupled to said at least one pre-combustor and configured to allow at least some of said burned mixture to pass through said at least one converging-diverging nozzle; and at least one geometric resonator coupled to said at least one converging-diverging nozzle and configured to receive said at least some of said burned mixture and detonate at least a portion of said received burned mixture, wherein said at least one converging-diverging nozzle comprises at least one surface having a plurality of ports configured to inject a second gas into said portion of said burned mixture passing through said converging-diverging nozzle, and wherein at least some of said plurality of ports injects said second gas at an angle in the range of 0° to 45° with respect to a normal to said surface.

70. A two-stage pulse detonation system, comprising:

at least one pre-combustor configured to burn a mixture of a hydrocarbon fuel and a gas;

at least one converging-diverging nozzle coupled to said at least one pre-combustor and configured to allow at least some of said burned mixture to pass through said at least one converging-diverging nozzle; and at least one geometric resonator coupled to said at least one converging-diverging nozzle and configured to receive said at least some of said burned mixture and detonate at least a portion of said received burned mixture, wherein said geometric resonator has a pressure wave reflection surface having a wedge shape with an upper surface and a lower surface, wherein said at least one converging-diverging nozzle comprises at least one surface having a plurality of ports configured to inject a second gas into said portion of said burned mixture passing through said converging-diverging nozzle, and wherein at least some of said plurality of ports injects said second gas at an angle in the range of 0° to 45° with respect to a normal to said surface.

* * * * *